(12) United States Patent
Banerjee et al.

(10) Patent No.: US 8,818,970 B2
(45) Date of Patent: Aug. 26, 2014

(54) PARTITIONING A DIRECTORY WHILE ACCESSING THE DIRECTORY

(75) Inventors: Anindya Banerjee, Pune (IN); Maneesh Pusalkar, Pune (IN)

(73) Assignee: Symantec Corporation, Mountain View, CA (US)

( * ) Notice: Subject to any disclaimer, the term of this patent is extended or adjusted under 35 U.S.C. 154(b) by 262 days.

(21) Appl. No.: 13/083,065

(22) Filed: Apr. 8, 2011

(65) Prior Publication Data

US 2012/0259823 A1    Oct. 11, 2012

(51) Int. Cl.
*G06F 17/30* (2006.01)
(52) U.S. Cl.
USPC .......................................................... 707/696
(58) Field of Classification Search
CPC ............................................... G06F 17/30091
See application file for complete search history.

(56) References Cited

U.S. PATENT DOCUMENTS

| 6,823,398 | B1 * | 11/2004 | Lee et al. | 710/5 |
| 7,082,601 | B2 * | 7/2006 | Ohsawa et al. | 717/149 |
| 8,266,136 | B1 * | 9/2012 | Pogde et al. | 707/711 |
| 2008/0154938 | A1 * | 6/2008 | Cheslow | 707/102 |

* cited by examiner

*Primary Examiner* — Dinku Gebresenbet
(74) *Attorney, Agent, or Firm* — Wilmer Cutler Pickering Hale and Dorr LLP (57) ABSTRACT

A process for reading entries in a directory is initiated. A first index is maintained to indicate how far the read has progressed in the directory. If, during execution of the process, the directory is partitioned into subdirectories, then a second index is maintained for each of the subdirectories to indicate how far the read has progressed in each of the subdirectories. A third index that indicates how far the read has progressed in the partitioned directory is also maintained.

20 Claims, 7 Drawing Sheets

PARTITIONING A DIRECTORY WHILE ACCESSING THE DIRECTORY

BACKGROUND

It is common for threads to become serialized with processes to read entire directories within a storage system. In general, such a read operation from a directory, e.g., a "/home" directory, involves an operating system, a file system, and a memory component that stores the /home directory. The operating system provides a buffer and transmits an offset along with the read request to the file system. The file system, based on the offset, reads a data block stored in the /home directory. The file system writes the read data into the buffer and updates the offset value.

The operating system receives the updated offset value and transmits the updated offset value along another serial read request. The file system, based on the updated offset value, reads another data block from the /home directory and writes the read data into the buffer. This process continues until all the desired data is read from the directory once and only once.

One type of conventional serialized process places a shared lock on the directory being read; therefore, other processes are not able to use the directory while the lock is in place. This is not efficient. Increased computer usage and the Internet have led to an increase in content sharing including sharing files within directories. In other words, files within a directory may be accessed by one or more users, applications, clients, etc., simultaneously or serially. Unfortunately, exclusive access requests to files within the /home directory prevent the data from being shared with other types of requests.

Partitioning a directory helps to increase efficiency by allowing some partitions of the directory to be shared while others are being exclusively accessed. In order to accommodate exclusive access requests as well as other types of requests simultaneously, a directory may be partitioned. For example, the /home directory may be partitioned into additional subdirectories in order to facilitate multiple exclusive accesses simultaneously.

Unfortunately, if the directory is partitioned during a read operation, then an entry may be read twice due to the shuffling of the entries associated with the partitioning. Therefore, while partitioning of a directory may improve directory accessibility incident to a serialized process, it has the disadvantage of potentially missing a file in the read operation (e.g., a readdir operation) or reading a file more than once and reporting it more than once to the operating system. Thus, conventionally, partitioning is prevented from occurring during the execution of a serialized process such as a readdir operation. However, this can negatively impact the file system's performance because, as noted above, partitioning can increase efficiency.

SUMMARY

Accordingly, the ability to partition a directory while a read (e.g., readdir) operation is in progress, without missing entries and without returning duplicate entries, would be beneficial. It will become apparent to those skilled in the art after reading the detailed description of the present disclosure that embodiments according to the present disclosure provide these benefits.

In one embodiment, a process for reading entries in a directory (e.g., a readdir operation) is initiated, in order to produce a listing of the entries (e.g., file names) in the directory. A first index is maintained to indicate how far the read has progressed in the directory. If, during execution of the process, the directory is partitioned into subdirectories, then a second index is maintained for each of the subdirectories to indicate how far the read has progressed in each of the subdirectories; that is, there is an additional index per subdirectory. A third index that indicates how far the read has progressed in the partitioned directory is also maintained. If multiple threads are executing in parallel, then thread-specific indexes are maintained. In one embodiment, entries in a subdirectory are read serially, and the subdirectories are read sequentially. Entries in the subdirectories are each read only once during execution of the read operation.

To illustrate features of the present disclosure, consider an example in which a directory contains files F1, F2, F3, F4, F5, F6, and F7. Due to partitioning, suppose that subdirectories (hash directories) H1, H2, H3, and H4 are created, files F1 and F4 are allocated to hash directory H1, files F2 and F5 are allocated to hash directory H2, files F3 and F6 are allocated to hash directory H3, and file F 7 is allocated to hash directory H1. Also, suppose that each call made by the operating system to the file system as part of a readdir operation can return a maximum of three entries and, before partitioning occurs, only one call was made. Hence, files F1, F2, and F3 will have been returned to the operating system. According to embodiments of the present disclosure, an index (the first index) is maintained to indicate entries already returned to the operating system. The index is thread-specific because multiple threads might be performing readdir operations on the same directory in parallel.

For each hash directory, an index (the second index) notes the current offset. In the example above, there will be an offset after file F1 for hash directory H1, an offset after file F2 for hash directory H2, an offset after file F3 for hash directory H3, and an offset of zero for hash directory H4. Thus, before partitioning, the first index was a single value; after partitioning, the first index becomes a list having a value for each hash directory (some of those values might be zero/empty).

There can be another index (the third index) that indicates, within the partitioned directory structure, how far the readdir operation has progressed. Immediately after partitioning, continuing with the example from above, that index will be set to zero within hash directory H1. In response to the next call for the same readdir operation, there will be a non-zero offset value within hash directory H1 as described above, and so the read will proceed from that offset—that is, file F4 in directory H1 will be read. Next, hash directory H2 is accessed, file F2 is skipped, and file F5 is read. Next, hash directory H3 is accessed, file F3 is skipped, and file F6 is read. Correspondingly, the index maintained for the partitioned directory (the third index, which was zero within hash directory H1) will now be zero in hash directory H4 (since hash directories H1, H2, and H3 have already been read). Continuing with the example, the next and final call for the readdir operation will retrieve the (third) index as zero within hash directory H4, file F7 is read, and the readdir operation terminates.

In summary, embodiments according to the present disclosure allow partitioning of a directory while a readdir operation is in progress. If the directory is partitioned while a readdir operation on the directory is in progress, then an entry will not be missed because that entry has been moved to a subdirectory, and duplicate entries will not be returned.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "initiating," "maintaining," "storing," "indicating," "reading," "producing," "associating," "partitioning," "setting," "executing," "clearing," "returning," or the like, refer to actions and processes (e.g., flowchart 600 of FIG. 6) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

Figure 1:
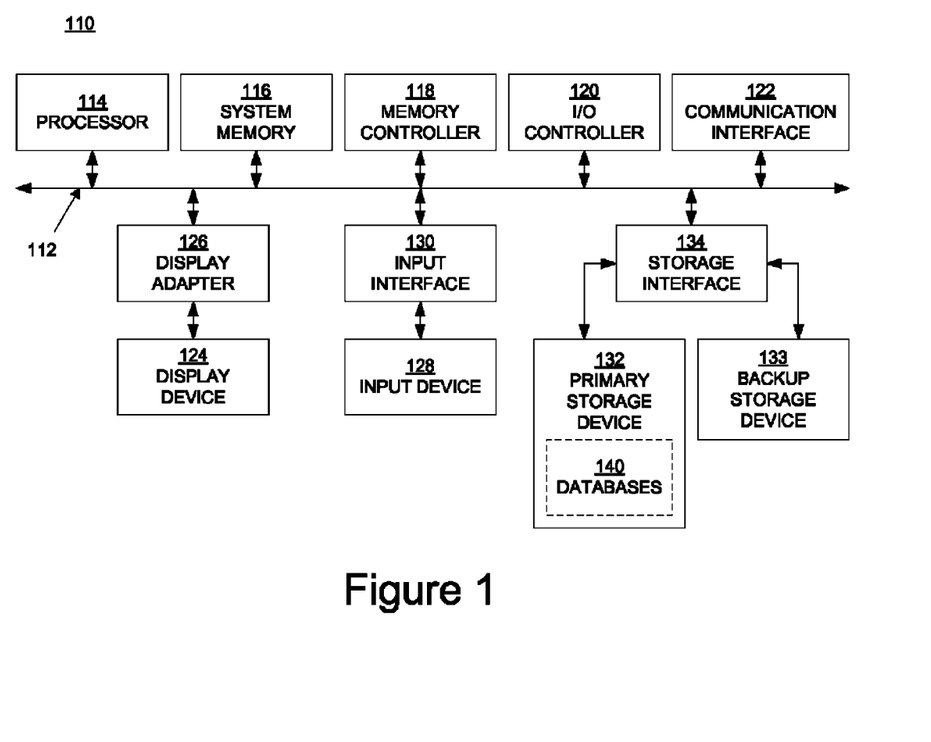
FIG. 1 is a block diagram of an example of a computing system capable of implementing embodiments according to the present disclosure.

FIG. 1 is a block diagram of an example of a computing system 110 capable of implementing embodiments of the present disclosure. Computing system 110 broadly represents any single or multi-processor computing device or system capable of executing computer-readable instructions. Examples of computing system 110 include, without limitation, workstations, laptops, client-side terminals, servers, distributed computing systems, handheld devices, or any other computing system or device. In its most basic configuration, computing system 110 may include at least one processor 114 and a system memory 116.

Processor 114 generally represents any type or form of processing unit capable of processing data or interpreting and executing instructions. In certain embodiments, processor 114 may receive instructions from a software application or module. These instructions may cause processor 114 to perform the functions of one or more of the example embodiments described and/or illustrated herein. For example, processor 114 may perform and/or be a means for performing, either alone or in combination with other elements, one or more of the identifying, determining, using, implementing, translating, tracking, receiving, moving, and providing described herein. Processor 114 may also perform and/or be a means for performing any other steps, methods, or processes described and/or illustrated herein.

System memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments computing system 110 may include both a volatile memory unit (such as, for example, system memory 116) and a non-volatile storage device (such as, for example, primary storage device 132).

Computing system 110 may also include one or more components or elements in addition to processor 114 and system memory 116. For example, in the embodiment of FIG. 1, computing system 110 includes a memory controller 118, an input/output (I/O) controller 120, and a communication interface 122, each of which may be interconnected via a communication infrastructure 112. Communication infrastructure 112 generally represents any type or form of infrastructure capable of facilitating communication between one or more components of a computing device. Examples of communication infrastructure 112 include, without limitation, a communication bus (such as an Industry Standard Architecture (ISA), Peripheral Component Interconnect (PCI), PCI Express (PCIe), or similar bus) and a network.

Memory controller 118 generally represents any type or form of device capable of handling memory or data or controlling communication between one or more components of computing system 110. For example, memory controller 118 may control communication between processor 114, system memory 116, and I/O controller 120 via communication infrastructure 112. Memory controller may perform and/or be a means for performing, either alone or in combination with other elements, one or more of the operations or features described herein.

I/O controller 120 generally represents any type or form of module capable of coordinating and/or controlling the input and output functions of a computing device. For example, I/O controller 120 may control or facilitate transfer of data between one or more elements of computing system 110, such as processor 114, system memory 116, communication interface 122, display adapter 126, input interface 130, and storage interface 134. I/O controller 120 may be used, for example, to perform and/or be a means for performing, either alone or in combination with other elements, one or more of the operations described herein. I/O controller 120 may also be used to perform and/or be a means for performing other operations and features set forth in the instant disclosure.

Communication interface 122 broadly represents any type or form of communication device or adapter capable of facilitating communication between example computing system 110 and one or more additional devices. For example, communication interface 122 may facilitate communication between computing system 110 and a private or public network including additional computing systems. Examples of communication interface 122 include, without limitation, a wired network interface (such as a network interface card), a wireless network interface (such as a wireless network interface card), a modem, and any other suitable interface. In one embodiment, communication interface 122 provides a direct connection to a remote server via a direct link to a network, such as the Internet. Communication interface 122 may also indirectly provide such a connection through, for example, a local area network (such as an Ethernet network), a personal area network, a telephone or cable network, a cellular telephone connection, a satellite data connection, or any other suitable connection.

Communication interface 122 may also represent a host adapter configured to facilitate communication between computing system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 122 may also allow computing system 110 to engage in distributed or remote computing. For example, communication interface 122 may receive instructions from a remote device or send instructions to a remote device for execution. Communication interface 122 may perform and/or be a means for performing, either alone or in combination with other elements, one or more of the operations disclosed herein. Communication interface 122 may also be used to perform and/or be a means for performing other operations and features set forth in the instant disclosure.

As illustrated in FIG. 1, computing system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data from communication infrastructure 112 (or from a frame buffer, as known in the art) for display on display device 124.

As illustrated in FIG. 1, computing system 110 may also include at least one input device 128 coupled to communication infrastructure 112 via an input interface 130. Input device 128 generally represents any type or form of input device capable of providing input, either computer- or human-generated, to computing system 110. Examples of input device 128 include, without limitation, a keyboard, a pointing device, a speech recognition device, or any other input device. In one embodiment, input device 128 may perform and/or be a means for performing, either alone or in combination with other elements, one or more of the operations disclosed herein. Input device 128 may also be used to perform and/or be a means for performing other operations and features set forth in the instant disclosure.

As illustrated in FIG. 1, computing system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of computing system 110.

In one example, databases 140 may be stored in primary storage device 132. Databases 140 may represent portions of a single database or computing device or a plurality of databases or computing devices. For example, databases 140 may represent (be stored on) a portion of computing system 110 and/or portions of example network architecture 200 in FIG. 2 (below). Alternatively, databases 140 may represent (be stored on) one or more physically separate devices capable of being accessed by a computing device, such as computing system 110 and/or portions of network architecture 200.

Continuing with reference to FIG. 1, storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into computing system 110. For example, storage devices 132 and 133 may be configured to read and write software, data, or other computer-readable information. Storage devices 132 and 133 may also be a part of computing system 110 or may be separate devices accessed through other interface systems.

Storage devices 132 and 133 may be used to perform, and/or be a means for performing, either alone or in combination with other elements, one or more of the operations disclosed herein. Storage devices 132 and 133 may also be used to perform, and/or be a means for performing, other operations and features set forth in the instant disclosure.

Many other devices or subsystems may be connected to computing system 110. Conversely, all of the components and devices illustrated in FIG. 1 need not be present to practice the embodiments described herein. The devices and subsystems referenced above may also be interconnected in different ways from that shown in FIG. 1. Computing system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 110. All or a portion of the computer program stored on the computer-readable medium may then be stored in system memory 116 and/or various portions of storage devices 132 and 133. When executed by processor 114, a computer program loaded into computing system 110 may cause processor 114 to perform and/or be a means for performing the functions of the example embodiments described and/or illustrated herein. Additionally or alternatively, the example embodiments described and/or illustrated herein may be implemented in firmware and/or hardware. For example, computing system 110 may be configured as an application specific integrated circuit (ASIC) adapted to implement one or more of the embodiments disclosed herein.

Figure 2:
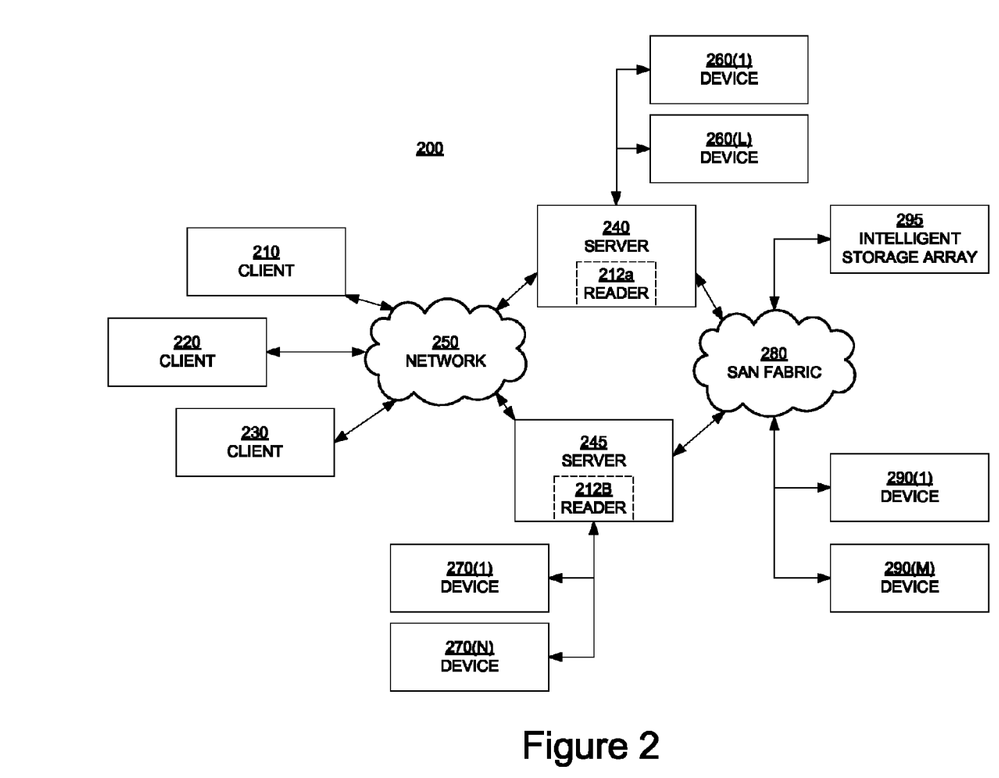
FIG. 2 is a block diagram of an example of a network architecture capable of implementing embodiments according to the present disclosure.

FIG. 2 is a block diagram of an example of a network architecture 200 in which client systems 210, 220, and 230 and servers 240 and 245 may be coupled to a network 250. Client systems 210, 220, and 230 generally represent any type or form of computing device or system, such as computing system 110 of FIG. 1.

Similarly, servers 240 and 245 generally represent computing devices or systems, such as application servers or database servers, configured to provide various database services and/or run certain software applications. Network 250 generally represents any telecommunication or computer network including, for example, an intranet, a wide area network (WAN), a local area network (LAN), a personal area network (PAN), or the Internet.

As illustrated in FIG. 2, one or more storage devices 260(1)-(L) may be directly attached to server 240. Similarly, one or more storage devices 270(1)-(N) may be directly attached to server 245. Storage devices 260(1)-(L) and storage devices 270(1)-(N) generally represent any type or form of storage device or medium capable of storing data and/or other computer-readable instructions. Storage devices 260(1)-(L) and storage devices 270(1)-(N) may represent network-attached storage (NAS) devices configured to communicate with servers 240 and 245 using various protocols, such as Network File System (NFS), Server Message Block (SMB), or Common Internet File System (CIFS).

Servers 240 and 245 may also be connected to a storage area network (SAN) fabric 280. SAN fabric 280 generally represents any type or form of computer network or architecture capable of facilitating communication between storage devices. SAN fabric 280 may facilitate communication between servers 240 and 245 and storage devices 290(1)-(M) and/or an intelligent storage array 295. SAN fabric 280 may also facilitate, via network 250 and servers 240 and 245, communication between client systems 210, 220, and 230 and storage devices 290(1)-(M) and/or intelligent storage array 295 in such a manner that devices 290(1)-(M) and array 295 appear as locally attached devices to client systems 210, 220, and 230. As with storage devices 260(1)-(L) and storage devices 270(1)-(N), storage devices 290(1)-(M) and intelligent storage array 295 generally represent any type or form of storage device or medium capable of storing data and/or other computer-readable instructions.

With reference to computing system 110 of FIG. 1, a communication interface, such as communication interface 122, may be used to provide connectivity between each client system 210, 220, and 230 and network 250. Client systems 210, 220, and 230 may be able to access information on server 240 or 245 using, for example, a Web browser or other client software. Such software may allow client systems 210, 220, and 230 to access data hosted by server 240, server 245, storage devices 260(1)-(L), storage devices 270(1)-(N), storage devices 290(1)-(M), or intelligent storage array 295. Although FIG. 2 depicts the use of a network (such as the Internet) for exchanging data, the embodiments described herein are not limited to the Internet or any particular network-based environment.

Returning to FIG. 2, in one embodiment, all or a portion of one or more of the example embodiments disclosed herein are encoded as a computer program and loaded onto and executed by server 240, server 245, storage devices 260(1)-(L), storage devices 270(1)-(N), storage devices 290(1)-(M), intelligent storage array 295, or any combination thereof. All or a portion of one or more of the example embodiments disclosed herein may also be encoded as a computer program, stored in server 240, run by server 245, and distributed to client systems 210, 220, and 230 over network 250. Accordingly, network architecture 200 may perform and/or be a means for performing, either alone or in combination with other elements, one or more of the operations disclosed herein. Network architecture 200 may also be used to perform and/or be a means for performing other operations and features set forth in the instant disclosure.

Servers 240 and 245 may respectively use partition directory readers 212a and 212b, respectively, in accordance with embodiments of the present disclosure, that are operable to read content from a partitioned directory such that entries within the partitioned directory are read only once coincident with a serialized process. One such serialized process is the readdir operation.

Figure 3:
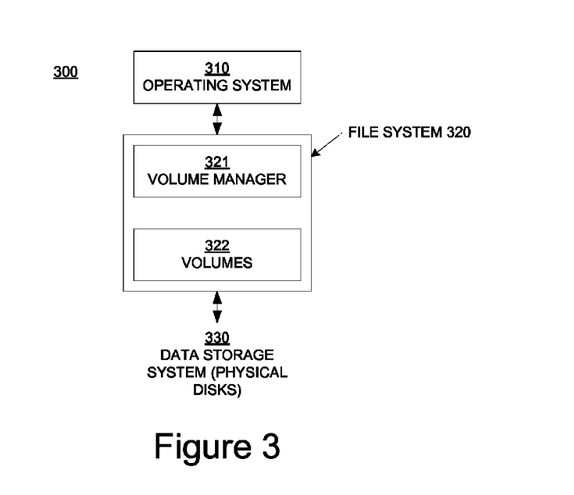
FIG. 3 is a block diagram of an example of a file management system upon which embodiments according to the present disclosure can be implemented.

With reference to FIG. 3, a file management system 300 includes an operating system 310 and a file system 320 coupled to a physical data storage system 330. The file system 320 includes a volume manager 321 that operates as a subsystem between the operating system 310 and one or more volumes 322 of data (blocks of data) that are stored in the data storage system 330. The data storage system 330 may include physical storage devices such as an array of physical disks, LUNs (SCSI logical units), or other types of hardware that are used to store data. The volume manager 321 overcomes restrictions associated with the physical storage devices by providing a logical volume management layer that allows data to be spread across multiple physical disks within a disk array (not shown) in a manner that is transparent to the operating system 310. Each of the volumes 322 can retrieve data from one or more of the physical storage devices, and the volumes 322 are accessed by file systems, databases, and other applications in the same way that physical storage devices are accessed.

The data storage system 330 stores content such as, for example, a "/home" directory. In one embodiment, the operating system 310 manages a buffer (not shown) for the file system 320. The operating system 310 can send a read operation request (call) along with an offset to the file system 320 as part of a serialized process or thread (e.g., a readdir operation). The file system 320 uses the offset value to identify the content to be read from the targeted directory (e.g., the /home directory). The file system 320 reads a number (N) of entries from the content within the targeted directory and places those entries into the buffer. The contents of the buffer are passed back to the operating system 310. The file system 320 updates the offset by N and passes the updated offset value to the operating system 310. As part of the serialized process, the operating system 310 sends another read operation along with the updated offset to the file system 320 and the process is repeated until the entire content of the targeted directory is read only once. As will be described further below, the targeted directory may be partitioned. In particular, the targeted directory can be partitioned while the read operation (e.g., the readdir operation) is in progress.

Figure 4A:
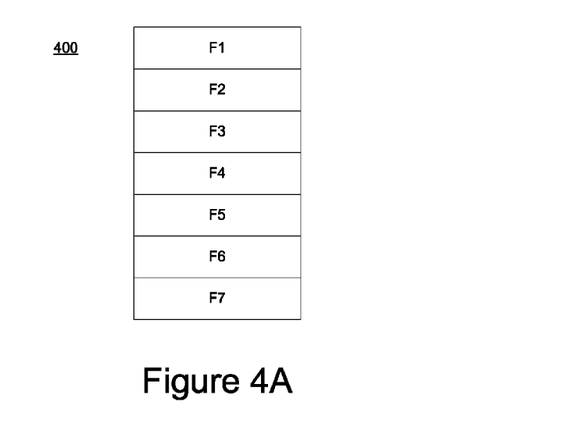
FIG. 4A illustrates an example of a directory in an embodiment according to the present disclosure.

FIG. 4A is an illustration representing a non-partitioned directory (or directory stream) 400 that contains an ordered sequence of directory entries representing file names F1, F2, F3, F4, F5, F6, and F7. There may be any number of such entries, and the content of the directory 400 may include entries that represent objects other than files (e.g., it may also contain a reference to another directory). In general, new entries are placed at the end ("bottom") of the directory 400.

The following example describes a read operation for a single thread. However, multiple threads may be performing a similar read operation on the same directory independently of and in parallel with the example read operation. The discussion below can be readily extended to situations in which multiple threads are performing a read operation at the same time on the same directory. For example, as will be described more fully below, embodiments according to the present disclosure maintain various index values to mark the progress of a read operation. If multiple threads are concurrently conducting read operations on the same directory, then those index values can be maintained per thread; that is, the index values are thread-specific.

Figure 4B:
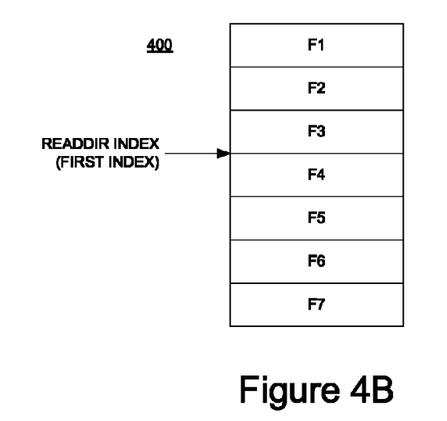
FIG. 4B illustrates an example of a read operation in progress in an embodiment according to the present disclosure.

In FIG. 4B, with reference also to FIG. 3, the file system 320 receives, from the operating system 310, a read request (e.g., a readdir request) to read content from the directory 400. In this example, this is the first read request, and so the offset value provided with the request is zero. The read operation may buffer more than one directory entry per call; in this example, a maximum of three entries are returned per call.

The read operation is performed serially, beginning at the top of the directory 400. Hence, the first three entries—entries F1, F2, and F3—are returned to the operating system 310. Also, an index value (offset) is maintained to indicate which entries have been returned to the operating system. In essence, the index value is a pointer that points to the next directory entry to be read and returned. In this example, the index value maintains an offset that points to entry F4. For ease of discussion, this index value may be referred to herein as the "readdir index." This index may also be referred to herein as the first index. The readdir/first index can be maintained in the inode structure for the directory 400.

Figure 4C:
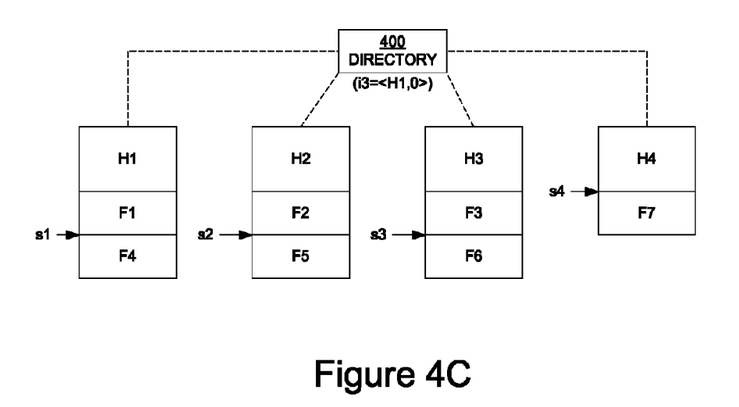
FIGS. 4C and 4D illustrate an example in which a directory is partitioned with a read operation in progress in an embodiment according to the present disclosure.

In FIG. 4C, the directory 400 is partitioned into four subdirectories (hash directories) H1, H2, H3, and H4. There may be any number of such subdirectories. Significantly, the directory can be and is partitioned while the read operation is in progress.

During the partitioning process, one directory entry is operated on at a time. An entry is accessed, and a hash value is computed for that entry. If a subdirectory does not yet exist for that hash value, then one is created; otherwise, the subdirectory for that hash value is looked up and the entry is moved into that subdirectory. In this example, subdirectory H1 includes entries F1 and F4, subdirectory H2 includes entries F2 and F5, subdirectory H3 includes entries F3 and F6, and subdirectory H4 includes entry F7. Although, in this example, the entries were allocated to the subdirectories in round-robin fashion, this is not necessarily always the case.

The presence of a readdir (first) index indicates that a read operation is in progress. As the partitioning process proceeds through the entries in the directory 400, if a readdir index is found, then a list of indices is created. The list includes an index or offset value for each of the subdirectories created by the partitioning. Each of these indices may be referred to herein as a second index.

The second indexes are used to indicate the current offset within each subdirectory. In essence, the second indexes point to the next entry to be read in each of the subdirectories. In the example of FIG. 4C, the second indexes/offsets are identified as s1, s2, s3, and s4. In this example, the entries F1, F2, and F3 have already been returned, and therefore the offset for subdirectory H1 is after entry F1 (pointing to entry F4), the offset for subdirectory H2 is after entry F2 (pointing to entry F5), the offset for subdirectory H3 is after entry F3 (pointing to entry F6), and the offset for subdirectory H4 is zero (pointing to the first entry F7 in that subdirectory).

Thus, before partitioning, a single index (the first index or readdir index) was used to indicate the progress of the read operation; after partitioning, a table or list of second indexes (one index per subdirectory) is used to indicate the progress of the read operation. That is, before partitioning, the readdir index indicates which entries have already been returned; after partitioning, the second indexes indicate which entries have been returned. The table of second indexes may include empty values (e.g., the value for subdirectory H4). The table may be incorporated into the inode structure for the directory 400, or it may be maintained as a separate data structure. The second indexes can also be stored within the subdirectories for validation purposes.

The list of indexes, one for each subdirectory (hash directory), is needed only if the directory 400 was partitioned while the readdir operation is in progress. Otherwise, the directory 400 needs to maintain only one offset value within the directory.

Continuing with reference to FIG. 4C, another value (which may be referred to herein as the third index) is maintained after partitioning to indicate the progress of the read operation in the partitioned directory. In this example, immediately after partitioning, the third index (identified as i3 in the figures) is set to zero within the first subdirectory, H1. Accordingly, in response to the next (second) call for the current read operation (for this thread), the read will be directed to subdirectory H1.

When subdirectory H1 is accessed in the next (second) call, the aforementioned second index (s1) associated with that subdirectory will be used to identify the next entry to be read and returned. In this example, the offset points to entry F4, and so entry F1 is skipped and entry F4 is read and returned.

Recall that, in this example, a maximum of three entries can be returned per call. In the example of FIG. 4C, entry F4 is the last entry in subdirectory H1, and so the read operation proceeds to the next subdirectory, H2. In general, all of the entries in a subdirectory are read in serial fashion before the read operation proceeds to the next subdirectory. (A different example, in which subdirectories include more than two entries, is presented in FIGS. 5A-5C.)

When subdirectory H2 is accessed, the offset (s2) points to entry F5, and so entry F2 is skipped and entry F5 is read and returned. In the example of FIG. 4C, entry F5 is the last entry in subdirectory H2, and so the read operation proceeds to the next subdirectory, H3. When subdirectory H3 is accessed, the offset (s3) points to entry F6, and so entry F3 is skipped and entry F6 is read and returned.

Because the maximum number of entries has been read and returned, this call (the second call) is completed. Accordingly, with reference now to FIG. 4D, the third index (i3) is set to zero within subdirectory H4, since subdirectories H1, H2, and H3 have already been read and no entries in subdirectory H4 have been read. Consequently, in the next (third) call for this read operation (and for this thread), the read operation is directed to subdirectory H4 and the entry F7 is read and returned. Because this is the last unread entry in any of the subdirectories H1, H2, H3, and H4, the current read operation (for this thread) is terminated. More specifically, the next call for this read operation (and for this thread) will return a null value, thereby signaling the end of the current read operation.

Figure 4D:
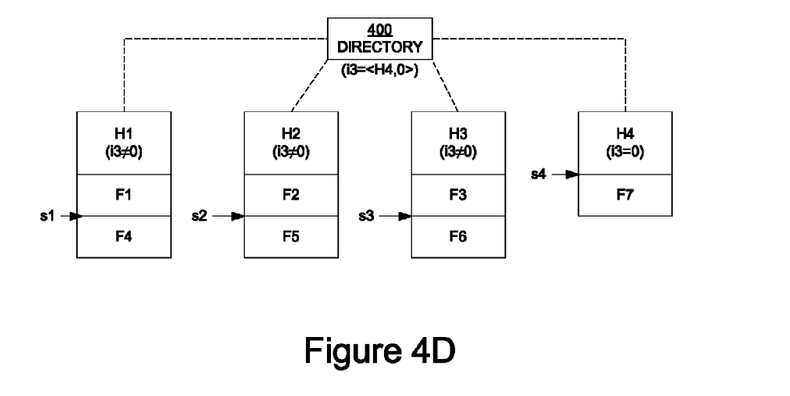

Thus, even though the directory 400 was partitioned while the read (readdir) operation was in progress, all entries in the directory are read and returned, and each entry is only read once.

The indexes/offsets for a particular thread are maintained while the readdir operation is in progress. If the last entry or an error is returned, the indexes/offsets can be cleared. In the worst case, if a thread does not take the readdir operation to completion, then the indexes/offsets can be cleared during the last close (when all references to the inodes are removed).

If a directory needs to be unpartitioned while a readdir operation is in progress, then a strategy similar to that just described can be pursued. Entries, starting from subdirectory H1, can be moved until the third index is reached. The corresponding offset is marked as the readdir index for an unpartitioned (or regular) directory.

Figure 5A:
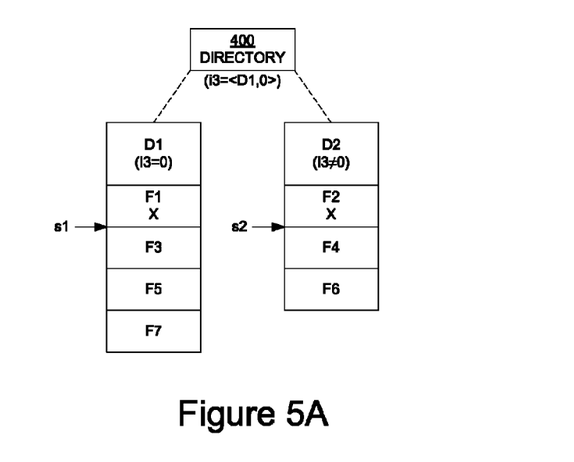
FIGS. 5A, 5B, and 5C illustrate another example in which a directory is partitioned with a read operation in progress in an embodiment according to the present disclosure.
Figure 5B:
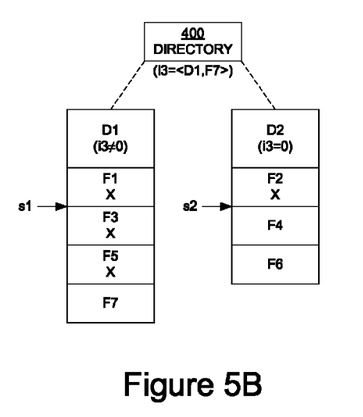
Figure 5C:
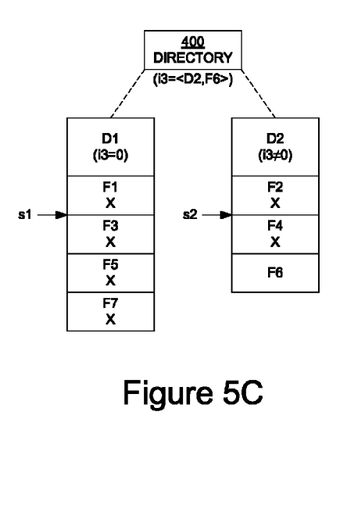

With reference now to FIGS. 5A, 5B, and 5C, an example is presented in which the directory 400 is partitioned into two subdirectories. In this example, subdirectory D1 includes entries F1, F3, F5, and F7, and subdirectory D2 includes entries F2, F4, and F6.

In this example, a maximum of two entries can be returned per call. Thus, the entries F1 and F2 have already been read prior to the partitioning; in FIGS. 5A-5C, an "X" is used to identify the entries that have been read. Thus, consistent with the discussion above, the offset (s1) for subdirectory D1 is after entry F1 (pointing to entry F3), and the offset (s2) for subdirectory D2 is after entry F2 (pointing to entry F4), as shown in FIG. 5A. Also, consistent with the discussion above, the third index (i3) has a value of zero within the first subdirectory, D1. Accordingly, in response to the next (second) call for the current read operation (for this thread), the read will be directed to subdirectory D1.

When subdirectory D1 is accessed in the next (second) call, the aforementioned second index (s1) associated with that subdirectory will be used to identify the next entry to be read and returned. In this example, the offset points to entry F3, and so entry F1 is skipped and entry F3 is read and returned. Also, because two entries can be read and returned per call in this example, entry F5 is also read and returned during the second call.

At the end of the second call, entries F1, F3, and F5 subdirectory D1, as well as entry F2 in subdirectory D2, have been read, as shown in FIG. 5B. As mentioned above, the entries in a subdirectory are read serially until all entries in the subdirectory are read. Once all the entries in a subdirectory are read, the read operation is directed to the next subdirectory. Consequently, in the present example, the third index (i3) is set to F7. Accordingly, in response to the next (second) call for the current read operation (for this thread), the read will be directed to entry F7 in subdirectory D1.

Continuing with reference to FIG. 5B, when subdirectory D1 is accessed in the next (third) call, the aforementioned third index (i3) will be used to identify the next entry to be read and returned. In this example, the offset points to entry F7, and so entries F1, F3, and F5 are skipped and entry F7 is read and returned. F7 is the last entry in subdirectory D1. Because two entries can be read and returned per call in this example, the read operation proceeds to subdirectory D2. In subdirectory D2, the second index/offset (s2) associated with that directory is used to identify which entry in that directory entry is to be read and returned. Accordingly, in this example, entry F4 is also read and returned during the third call. At the end of the third call, the third index/offset (i3) is set to F6 within the subdirectory D2, as shown in FIG. 5C.

As a result, in the next (fourth) call for this read operation (and for this thread), the read operation is directed to subdirectory D2. In this example, the index/offset (i3) now points to entry F6. Consequently, entry F6 is read and returned. Because this is the last unread entry in any of the subdirectories D1 and D2, the current read operation (for this thread) is terminated. More specifically, the next call for this read operation (and for this thread) will return a null value, thereby signaling the end of the current read operation.

In an alternate embodiment, the subdirectories can be read in round-robin fashion. For example, considering the example of FIG. 5B, in the next call after entries F3 and F5 are read and returned, the read operation can be directed to subdirectory D2 before entry F7 is read. In that next call, entries F4 and F6 are read and returned and, in the call after that, entry F7 is read. In such an embodiment, the third index i3 can be used to indicate which subdirectory is to be read, and the second indexes s1 and s2 can be changed to track progress through the subdirectories D1 and D2, respectively.

Figure 6:
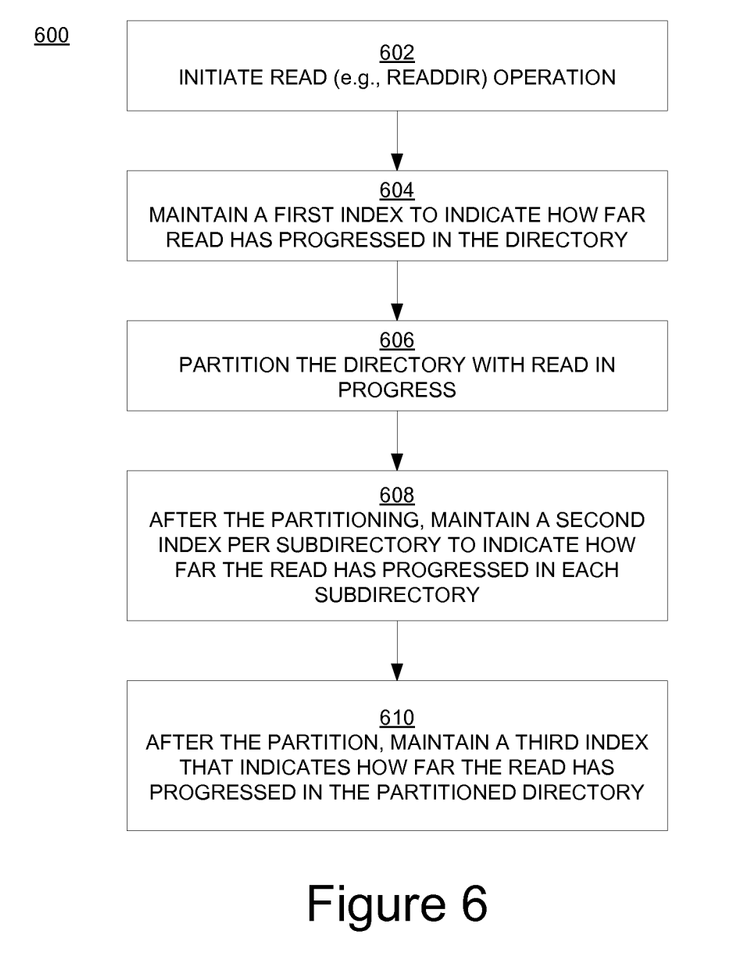
FIG. 6 is a flowchart of an example of a computer-implemented process for partitioning a directory with a read operation in progress in an embodiment according to the present invention.

FIG. 6 is a flowchart 600 of a computer-implemented process for partitioning a directory during a read (e.g., readdir) operation according to an embodiment of the present disclosure. Flowchart 600 can be implemented as computer-executable instructions residing on some form of non-transitory computer-readable storage medium (e.g., using computing system 110 of FIG. 1).

In block 602, a process for reading entries in a directory (e.g., a readdir operation) is initiated, in order to produce, for example, a listing of the entries (e.g., file names) in the directory.

In block 604, a first index (e.g., the readdir index) is maintained to indicate how far the read has progressed in the directory.

In block 606, the directory is partitioned into subdirectories.

In block 608, after the partitioning, a second index (e.g., s1, s2, s3, s4) is maintained for each of the subdirectories (a second index per subdirectory) to indicate how far the read has progressed in each of the subdirectories.

In block 610, a third index (e.g., i3) that indicates how far the read has progressed in the partitioned directory is also maintained.

In summary, embodiments according to the present disclosure allow partitioning of a directory while a read (e.g., readdir) operation is in progress. If the directory is partitioned while a readdir operation on the directory is in progress, then an entry will not be missed because that entry has been moved to a subdirectory, and duplicate entries will not be returned.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A non-transitory computer-readable storage medium having computer-executable instructions for causing a computer system to perform a method comprising:
   initiating a process comprising a read of entries in a directory, wherein said process is associated with a first thread that is configured to execute in parallel with a second thread;
   maintaining a first index to indicate how far said read has progressed in said directory;
   maintaining a second index for each of a plurality of subdirectories in the event said directory is partitioned, during execution of said process, to create a partitioned directory comprising said plurality of subdirectories to indicate how far said read has progressed in each of said subdirectories;
   maintaining a third index to indicate how far said read has progressed in said partitioned directory; and
   clearing values for said first and second indices after said process is completed across the plurality of subdirectories.

2. The computer-readable storage medium of claim 1 wherein said process is configured to produce a listing of said entries.

3. The computer-readable storage medium of claim 2 wherein said process comprises a readdir operation and wherein said listing comprises file names in said directory.

4. The computer-readable storage medium of claim 1 wherein said second index and said third index are specific to said first thread.

5. The computer-readable storage medium of claim 1 wherein entries in said subdirectories are each read only once during execution of said process.

6. The computer-readable storage medium of claim 1 wherein entries in a subdirectory are read serially, and wherein said subdirectories are read sequentially.

7. The computer-readable storage medium of claim 1 wherein said method further comprises clearing values for said first, second, and third indices after said process is completed across all of said subdirectories.

8. A computer system comprising:
   a processor; and memory coupled to said processor and having stored therein instructions that, when executed by said computer system, cause said computer system to execute a method comprising:

reading a subset of a plurality of entries in a directory to generate a listing of said plurality of entries, wherein said reading is associated with a first thread that is configured to execute in parallel with a second thread;

setting a first index to indicate said subset has been read;

partitioning, before all entries in said directory have been read, said directory to form a partitioned directory comprising a plurality of subdirectories;

setting, for each of said subdirectories, a second index to indicate which entries in said subdirectories have been read;

setting a third index to indicate how far said read has progressed in said partitioned directory; and clearing values for said first and second indices after said reading is completed across said subdirectories.

9. The computer system of claim 8 wherein said reading comprises a readdir operation and wherein said listing comprises file names in said directory.

10. The computer system of claim 8 wherein said second index and said third index are specific to said first thread.

11. The computer system of claim 8 wherein entries in said subdirectories are each read only once during said reading.

12. The computer system of claim 8 wherein entries in a subdirectory are read serially, and wherein said subdirectories are read sequentially.

13. The computer system of claim 8 wherein said method further comprises clearing values for said first, second, and third indices after said reading is completed across all of said subdirectories.

14. A non-transitory computer-readable storage medium having computer-executable components comprising:

an operating system; and a file system coupled to said operating system, said file system comprising a directory comprising a plurality of entries;

wherein in response to a call issued by said operating system as part of a read operation, said file system is configured to return a number of said entries to said operating system and maintain a first index to indicate entries that have been returned to said operating system, and wherein said read operation is associated with a first thread that is configured to execute in parallel with a second thread;

wherein in the event said directory is partitioned, during execution of said read operation, to create a partitioned directory comprising a plurality of subdirectories, said file system is further configured to maintain:

a second index for each of said subdirectories to indicate entries in said subdirectories that have been returned to said operating system, and a third index to indicate how far said read operation has progressed in said partitioned directory, wherein said first and second indices are cleared after said read operation is completed across all of said subdirectories.

15. The computer-readable storage medium of claim 14 wherein said read operation is configured to produce a listing of said entries.

16. The computer-readable storage medium of claim 15 wherein said read operation comprises a readdir operation and wherein said listing comprises file names in said directory.

17. The computer-readable storage medium of claim 14 wherein said second index and said third index are specific to said first thread.

18. The computer-readable storage medium of claim 14 wherein entries in a subdirectory are read serially, and wherein said subdirectories are read sequentially.

19. The computer-readable storage medium of claim 14 wherein values for said first, second, and third indices are stored in an inode structure associated with said directory.

20. The computer-readable storage medium of claim 14 wherein offset values associated with said second and third indices are returned to said operating system by said file system.

* * * * *